United States Patent
Grimes et al.

(10) Patent No.: US 6,511,253 B1
(45) Date of Patent: Jan. 28, 2003

(54) METHOD FOR MOUNTING A HOUSING TO AN OBJECT AND DEVICES RELATED THERETO

(76) Inventors: Steve Grimes, 100 Chestnut St., Wrentham, MA (US) 02093; Peter J. Jones, 70 Oakley Rd., Belmont, MA (US) 02478

( * ) Notice: Subject to any disclaimer, the term of this patent is extended or adjusted under 35 U.S.C. 154(b) by 0 days.

(21) Appl. No.: 09/440,871

(22) Filed: Nov. 16, 1999

Related U.S. Application Data

(60) Provisional application No. 60/108,539, filed on Nov. 16, 1998.

(51) Int. Cl.[7] .............................................. B65D 45/32
(52) U.S. Cl. ........................ 403/327; 403/372; 403/368; 285/321; 285/345
(58) Field of Search .................. 403/327, 328, 403/372, 367, 368, 220, 225, 228; 285/321, 345, 347

(56) References Cited

U.S. PATENT DOCUMENTS

| | | | | |
|---|---|---|---|---|
| 3,467,476 A | * | 9/1969 | Konig | 403/372 X |
| 4,712,708 A | * | 12/1987 | Taguchi | 403/372 X |
| 4,743,079 A | * | 5/1988 | Bloch | 403/328 X |
| 5,909,901 A | * | 6/1999 | Zillag et al. | 285/321 X |
| 5,979,946 A | * | 11/1999 | Petersen et al. | 285/321 X |

* cited by examiner

*Primary Examiner*—Lynne H. Browne
*Assistant Examiner*—John R. Cottingham
(74) *Attorney, Agent, or Firm*—Peter F. Corless; William J. Daley, Jr.; Edwards & Angell, LLP

(57) ABSTRACT

Featured is a mounting device and methods related thereto for mounting the device to an object including cylindrical objects such as camera lenses, rifle scopes, telescopes, monoculars and binoculars. The mounting device includes a housing, having an exterior surface, that is to be mounted to an object and a resilient member. The housing is configured so as to include an interior passage having an inner cross section larger than that of the object to which the housing is to be mounted onto, and at least one slot extending from the housing exterior surface and into the housing interior passage. The resilient member is disposed about at least a portion of the housing exterior surface so a portion of the resilient member is positioned within each of the at least one slot in the housing and so this portion of the resilient member protrudes into the interior passage. In more specific aspects of the present invention, the housing is configured with a plurality of slots being arranged concentrically about the housing. A portion of the resilient member is positioned within each of the plurality of slots so these resilient member portions protrude into the interior passage. This protruding portion or these protruding portions of the resilient member contact and frictionally grab the object when it is inserted into the interior passage.

24 Claims, 7 Drawing Sheets

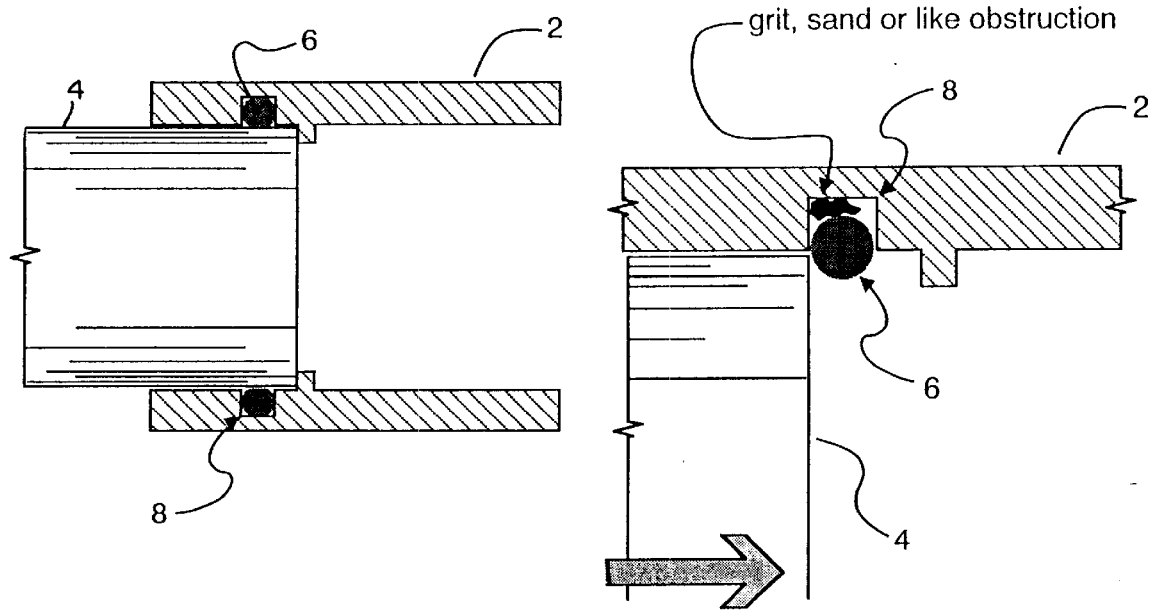
FIG. 1 PRIOR ART
FIG. 2 PRIOR ART
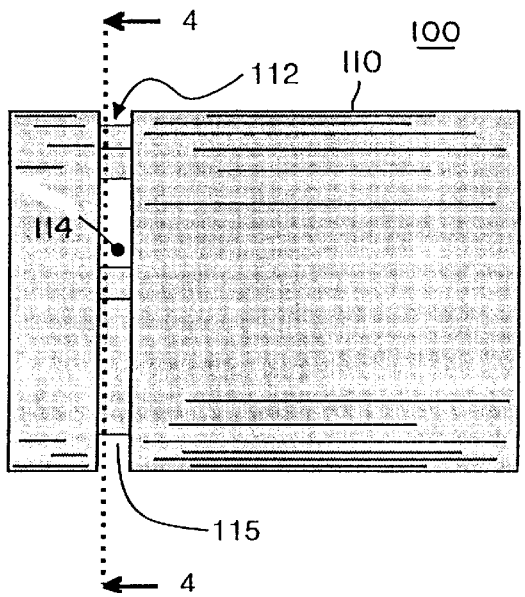
FIG. 3
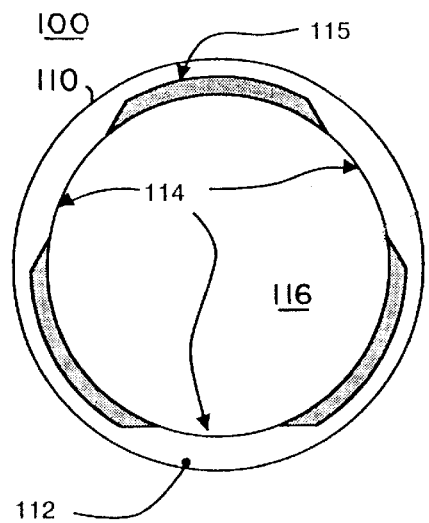
FIG. 4

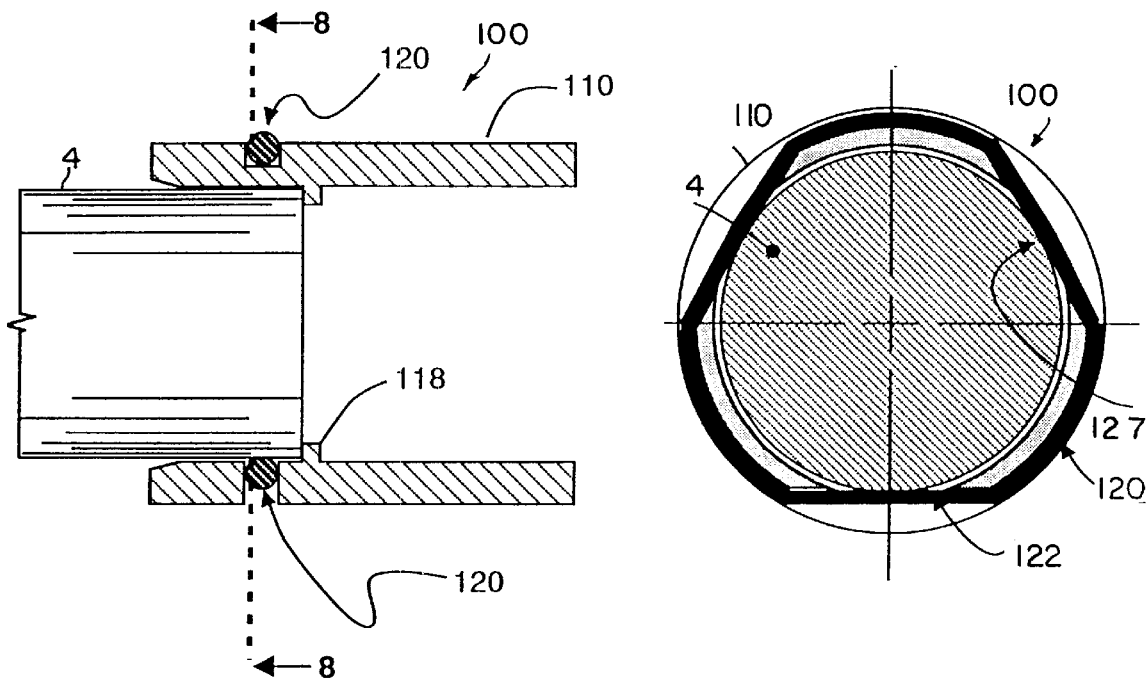
FIG. 7
FIG. 8
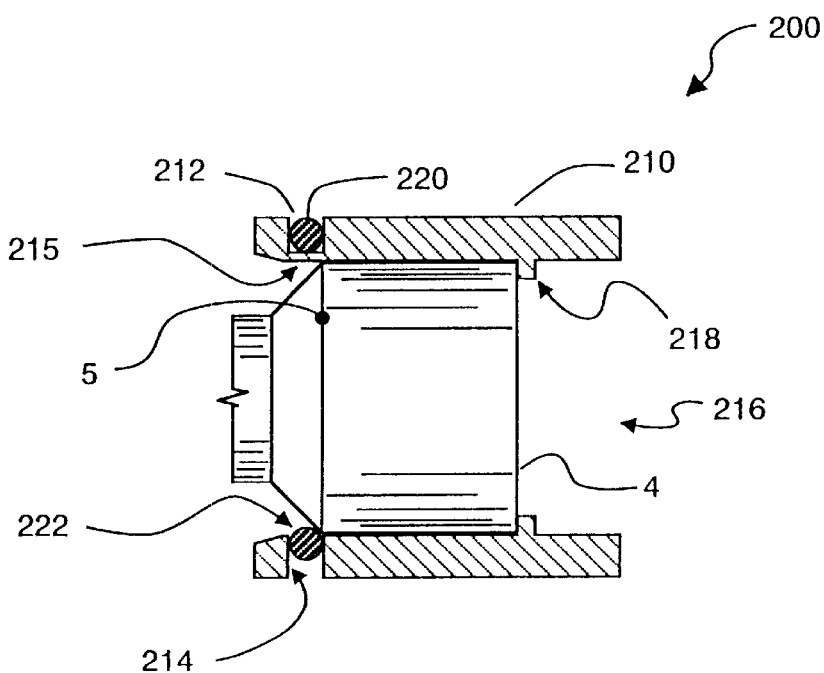
FIG. 9

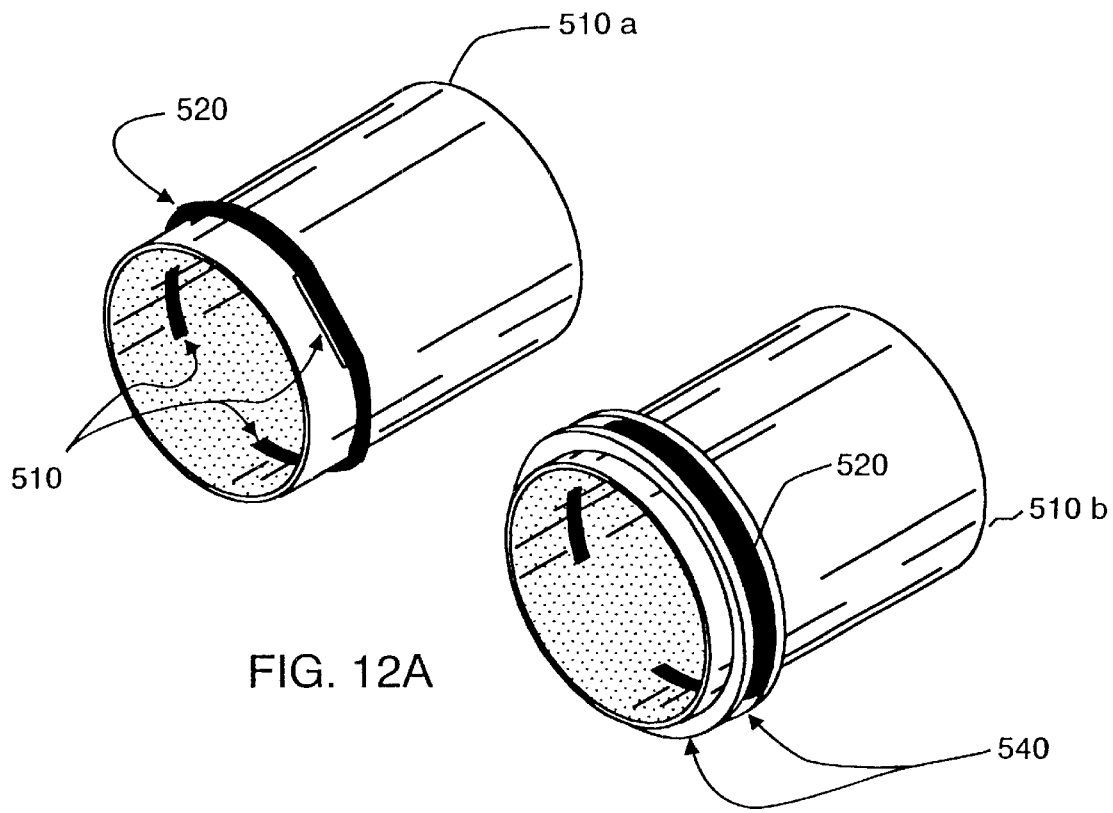
FIG. 12A
FIG. 12B
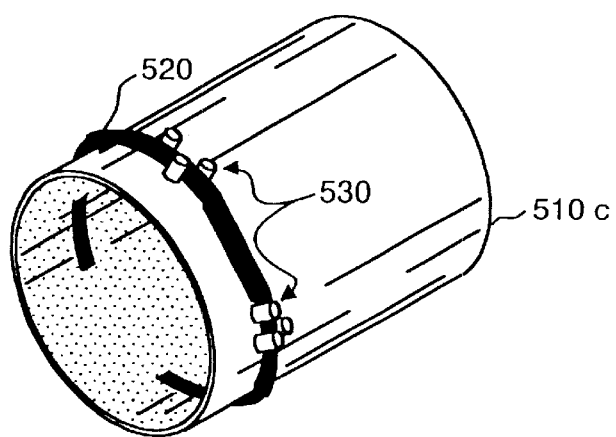
FIG. 12C

METHOD FOR MOUNTING A HOUSING TO AN OBJECT AND DEVICES RELATED THERETO

This application claims the benefit of co-pending U.S. provisional application No. 60/108,539, filed Nov. 16, 1998, which is incorporated herein by reference in its entirety.

FIELD OF INVENTION

The present invention relates to a method for mounting a housing to an object such as a cylindrical object and device (s) related thereto, and more particularly to a method for mounting a housing to an object using a resilient member such as, for example, an O-ring that allows the housing to be easily and securely mounted and dismounted without the use of tools.

BACKGROUND OF THE INVENTION

It is necessary and desirable in certain circumstances to have the capability to mount a housing onto an object, a cylindrical object without the use of tools. More particularly a mounting technique in which the housing can be easily mounted thereto and dismounted therefrom. An example of such a circumstance is attaching or securing an optical filter or filter housing to a lens assembly.

One technique, as illustrated in FIG. 1, involves mounting a housing 2 to an object 4 by means of an O-ring 6 that is disposed in an internal groove 8 formed or machined in the interior surface of the housing aperture that receives the object. In this arrangement, the object 4 is slid into the aperture in the housing 2 or conversely the housing 2 is slid over the object 4 so the object is received in the housing aperture. When the object is disposed within the housing, the O-ring 6 is compressed in the internal groove 8 and against both the housing 2 and the object 4. This compression of the O-ring 6 provides the friction and clamping forces that holds the housing 2 onto the object 4.

Although this technique has proved effective in certain situations, there are situations under which this technique exhibits or has a problem(s). In one case, and as shown in FIG. 2, a piece of grit, sand or dirt is trapped behind the O-ring 6 in the internal groove 8. This prevents the O-ring 6 from being compressed in the internal groove 8 so the object can pass, thus jamming the O-ring and/or object in the housing aperture. The presence of the grit, dirt or sand also can cause the O-rings to become damaged. In addition, such an application may result in the establishment of tighter size tolerances than that which are practical or achievable in the manufacturing process for the object 4.

Other techniques for mounting a housing to an object involve the use of screw or threaded connections, castellated slots, clamping devices, set screws, adhesives and/or adhesive tape. These other techniques also are disadvantageous in many situations because their use may not be desirable or practical. For example, the presence of grit or sand can cause the threaded connection to become damaged, the object may not have threads, clamping devices or systems may be too bulky or require the use of tools that are not readily available in the field, set screws may damage the object or become lost and the adhesive systems or methods may not hold under all environmental conditions (e.g., in rain or underwater) or leave an undesirable residue(s). In addition, some of these techniques may require tighter size tolerances than that which is practical or achievable for manufacturing of the object.

It thus would be desirable to provide a new method(s) and device(s) for mounting a housing to an object such as a cylindrically shaped object that does not involve or require special tools or adhesives as well as devices related thereto. It would be particularly desirable to provide such a device and method that would allow such mounting when there is grit or sand present or grit as well as low tolerances. Such devices preferably would be simple in construction and less costly than prior art devices and such methods would not require highly skilled users to utilize the device or the use of specialized tools if any tools at all.

SUMMARY OF THE INVENTION

The present invention features a device and method for mounting a housing to an object including cylindrical objects such as camera lenses, rifle scopes, telescopes, monoculars and binoculars. Using such a device and method, a housing can be securely and easily mounted to and dismounted from the object without the use of tools. Additionally, such a device and method are tolerant of manufacturing size variations and are useable in the presence of grit, snow, rain, ice and dirt.

In a first aspect of the invention, the object mounting device includes a housing and at least one resilient member. The housing includes an interior passage or cavity having an inner cross section larger than that of the object to which the housing is to be mounted onto. At one or more locations, preferably a plurality of locations and more preferably a multiplicity of locations, there is formed or provided in the housing a slot or slots, which slots are arranged concentrically about the housing. In more specific embodiments, the slots are equi-angularly spaced about the long axis and exterior surface of the housing. Each slot also extends from the housing exterior surface, through the housing and into the interior passage.

The resilient member is disposed about the housing exterior surface so a portion of the resilient member is positioned within each slot formed in the housing and also protrudes into the interior passage. More specifically, the portion(s) of the resilient member protruding into the interior passage protrude a predetermined distance beyond the inner surface of the interior passage so the protruding portion(s) contact and frictionally grab the object when it is inserted into the interior passage. In specific embodiments, the predetermined distance is about one-half ($\frac{1}{2}$) or less the thickness or cross-sectional thickness of the resilient member and more specifically a distance equal to about one-third ($\frac{1}{3}$) such a thickness.

In a specific embodiment, the plurality of concentrically formed slots are positioned in the housing so the protruding portions of the resilient member disposed therein contact and frictionally grab an end face of the object when it is inserted into the interior passage. In this way, the object mounting device can resist forces imposed along the long axis of the housing.

In a second aspect of the present invention, an object mounting device includes a housing configured with a plurality of concentric slots that are arranged to form a plurality or more of sets of slots and at least a plurality of resilient members. Each set of slots are longitudinally spaced from each other and each slot extends from the housing exterior surface, through the housing and into the interior passage.

Each resilient member is disposed about the housing exterior surface so portions of each resilient member are positioned within a set of slots formed in the housing and protrude into the interior passage. Thus, when there is a plurality of slots and resilient members, there is one resilient member for each set of one or more slots. The portions protruding into the interior passage protrude a predetermined distance beyond the inner surface of the interior passage. In specific embodiments, the predetermined distance is about one-half (½) or less the thickness or cross-sectional thickness of the resilient member and more specifically a distance equal to about one-third (⅓) such a thickness.

The sets of one or more slots also are preferably positioned on the housing so at least the protruding portions of one of the plurality of resilient members contact and frictionally grab the object when it is inserted into the interior passage. In a more specific embodiment, at least one of the sets of slots is positioned so the protruding portion(s) of the resilient member disposed therein contacts and frictionally grabs an end face of the object when it is inserted into the interior passage. In this way, the object mounting device can resist forces imposed along the long axis of the housing.

In a third aspect of the invention, the resilient member only extends around a portion of the exterior surface of the housing and the object mounting device further includes means to secure the resilient member in place and so portions thereof protrude into the housing interior passage. In one specific embodiment, the resilient member is a resilient band that is secured at either end to the housing by means of a clamp. In a second specific embodiment, the resilient member is a ring of a resilient material and the securing means comprises two outwardly extending structure about which are looped portions of the resilient ring. The clamps and outwardly extending structures are positioned on the housing so the resilient band or resilient ring are appropriately tensioned so the protruding portion(s) thereof frictionally grab and contact the object.

In more specific embodiments, the object mounting device includes means for localizing each resilient member so it remains disposed within the slots. In one specific embodiment, a groove is formed or provided in the exterior surface of the housing and the slots are formed within the groove. In this arrangement, the resilient member is disposed in the groove and the slots. In other specific embodiments, ridges, pins or blocks or positioned about the exterior surface of the housing proximate the slot(s) so as to prevent longitudinal movement of the resilient member. Also, the leading edge of the housing interior passage can configured so as to not present a sharp edge (i.e., be chamfered).

In use, the housing with the resilient member is pressed onto the object so a portion of the object is received within the housing interior passage. The portion(s) of the resilient members protruding into the interior passage are forced outwards by the object thereby letting the object to fully enter the interior passage. The resiliency or elastic tension of the resilient member causes the resilient member to maintain a constricting tension on the object so as to securely and frictionally grab the object and thus hold the housing securely to the object. Conversely, a user can easily remove or dismount the housing from the object by pulling the housing off the object.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein:

FIG. 1 is a partial cross-section view along the long axis of a housing that is mounted to a cylindrical object using a conventional O-ring technique;

FIG. 2 is a close-up of a portion of the partial cross-section view of FIG. 1 illustrating an obstruction in the groove;

FIG. 3 is a side view of a housing for one embodiment of an object mounting device according to the present invention;

FIG. 4 is a cross-section view taken along line 4—4 of FIG. 3;

FIG. 7 is a partial cross-section view of the object mounting device when mounted on an object taken along the long axis of the housing of FIG. 3;

FIG. 8 is a cross-section view taken along line 8—8 of FIG. 7;

FIG. 9 is a is a partial cross-section view of an object mounting device according to a second embodiment of the present invention taken along the long axis of the housing;

FIGS. 12A–12D are axonometric views of alternative housing arrangements for the forgoing object mounting devices illustrating alternative techniques for holding a resilient member in position.

DESCRIPTION OF THE PREFERRED EMBODIMENT

Figure 5:
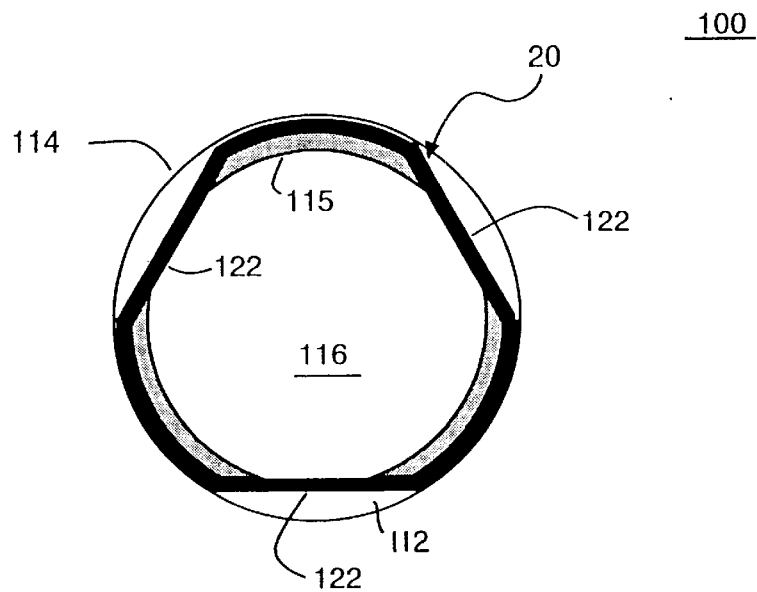
FIG. 5 is another cross-section view taken along line 4—4 of the housing of FIG. 3 with a resilient member disposed in the groove.
Figure 6:
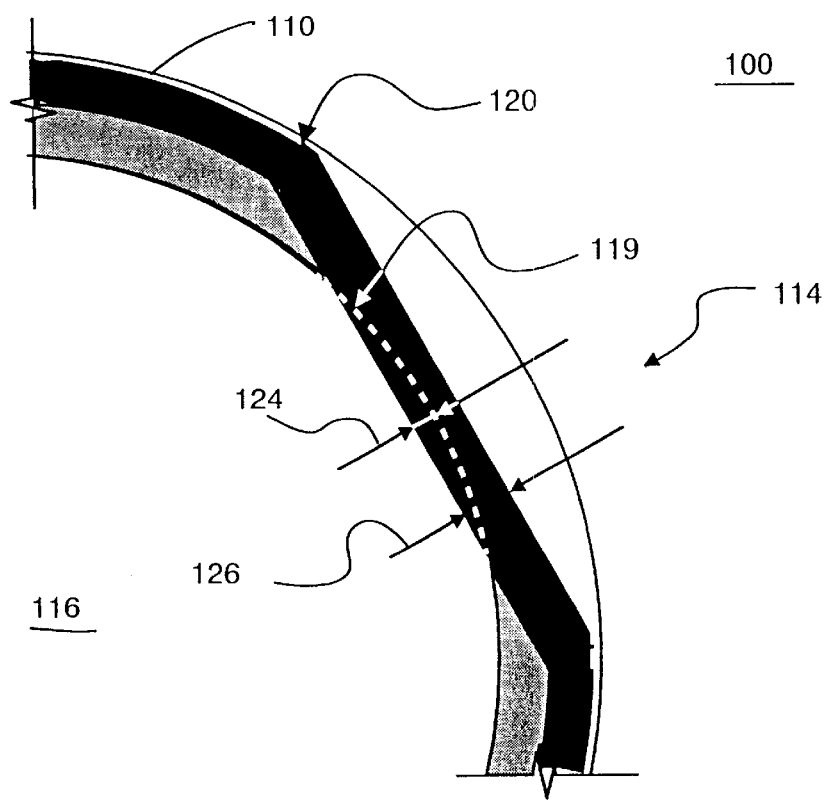
FIG. 6 is a diagrammatic close-up view of the cross-section depicted in FIG. 5.

Referring now to the various figures of the drawing wherein like reference characters refer to like parts, there is shown in FIGS. 3–8 an object mounting device 100 according to a first embodiment of the present invention including a housing 110 and a resilient member 120. The housing 110 is mounted to an object and is secured thereto by means of the resilient member 120 as hereinafter described. The interior passage 116 of the housing 110 in which is received the object is configured so as to complement the shape of the object. In an illustrative embodiment, the object is a cylindrical object 4 and the interior passage 116 also is cylindrical. In a specific embodiment, the housing 110 is made from a metal such as aluminum, however, this is not a limitation as the housing can be made from any material that is capable of withstanding the mechanical loads and environmental conditions to which the housing can be exposed.

The housing 110 is machined or configured with a groove 112 that runs about the circumference of the outer surface of the housing. The depressed surface of the groove 112, as more clearly shown in FIG. 4, is further machined or configured in a plurality of areas so the groove communicates via one or more openings or slots 114, preferably a plurality or more of slots, with the housing interior passage 116. As a result of such machining or configuring, the remaining depressed surface of the groove 112 forms a plurality of lands 115. The slots 114 and lands 115 also are formed in the groove 112 so a chord defined by each slot 114 is disposed within the interior passage 116. Additionally, and as discussed below, the slots 114 and lands 115 are formed so a portion(s) of the resilient member 120 extends a predetermined distance 124 (FIG. 6) into the housing interior passage 116.

The groove 112 also is positioned or formed in the housing 110 so it is provided a predetermined distance from an internal lip 118 that is formed about the circumference of the inner surface of the housing interior passage 116. More It particularly, the groove 112 is positioned in the housing 110 with respect to the internal lip 118 so a resilient member 120 that is disposed in the groove will grip a side of the object to be located in the housing.

In a specific embodiment, the internal lip 118 forms a stop for the cylindrical object 4 when it is inserted into the housing 110. The lip 118 in conjunction with the housing interior passage 116 also generally defines the space available within the housing 110 for receiving the cylindrical object 4.

As shown in FIG. 5, the resilient member 120 is located in the groove 112 so portions 122 thereof extend parallel to the chord defined by each slot 114 and so these portions extend within the housing interior passage 116. More specifically, and with reference to FIG. 6, each slot 114 is machined or formed in the housing 110 so each of these portions 122 extends into the housing interior passage a predetermined distance 124 beyond the line 119 circumscribed or defined by the inner surface of the housing. Generally, the predetermined distance 124 is established so the portions 122 of the resilient member 120 within the housing interior passage 116 are not dragged out of the groove 112 and thus jammed by the cylindrical object 4 when the cylindrical object is being inserted into the housing. Preferably, the slots are formed or machined so these portions extend a pre-determined distance 124 of about one-half or less the thickness 124 or cross-section thickness of the resilient member 120, more particularly a distance of about one-third the diameter or thickness of the resilient member.

As shown in FIGS. 7–8, when the housing 110 is mounted upon the cylindrical object 4, the resilient member portions 122 extending into the interior passage 116 are forced or pushed outwardly by the outer surface of the cylindrical object 4 so as to lie substantially within the slot 114 and groove 112. The material for the resilient member 120 is selected so the cylindrical object 4 is frictionally grasped along the line 127 where the cylindrical object and the resilient member are in contact. Preferably, the material being used is such that the resilient member 120 does not have to be replaced after each use.

In an exemplary embodiment, the resilient member 120 is an O-ring constructed or made of an elastomeric material such as for example rubber, viton, neoprene and silicone. Alternatively, the resilient member 120 is a coil spring, a circular spring band or a spring clip made of a metal such as steel or other resilient material.

The object mounting device 100 so configured is capable of being easily mounted and secured to the cylindrical object 4 without the use of tools. Also the above described combination of the housing 110 and resilient member 120 yields a mounting device 100 that is tolerant of manufacturing size variations as well as being capable of use under various conditions such as in the presence of dirt, grit, snow, rain and ice.

In an illustrative embodiment, the object mounting device 100 includes a housing 110 that is constructed of aluminum. The housing 110 is machined or milled so a groove 112, approximately 0.196 in. wide and approximately 0.119 in. deep, is provided about the circumference and approximately 0.207 in. back from an edge of the housing. The depressed surface of the groove 112 is further machined along a tangent line in five locations that are equi-angularly spaced so as to create five lands 115 and five slots 114 that communicate with a cylindrical interior passage 116 having a diameter of about 2.751 in. An O-ring made of neoprene, comprising the resilient member 120 and having a 0.875 in. cross section and a nominal inner diameter of 3 in., is stretched to fit into the groove 112. After being disposed within the groove and when released, the resilient member 120 or O-ring is drawn into the slots 114 so portions 122 thereof protrude into the housing interior passage 116. Such an object mounting device 100 is capable of grasping and remaining mounted to, for example, a cylindrical optical device having a nominal outer diameter of about 2.747 in. When the cylindrical optical device is inserted into the housing passage and resting against the lip 118 or stop, the resilient member portions 122 extending into the interior passage 116 frictionally grasp the cylindrical optical device so it remains disposed with the housing 110.

There is shown in FIG. 9 an object mounting device 200 according to a second embodiment of the present invention including a housing 210 and a resilient member 220. As with the first embodiment, the housing 210 is configured with a groove 212 and plurality of slots 214 and lands 215, which slots communicate with the interior passage 216 of the housing. Additionally, the housing 210 includes an internal lip 218 or internal stop which the object 4 abuts when fully inserted within the housing.

In the second embodiment, the groove 212 and correspondingly the slots 214 and the lands 215 are formed in the housing 210 so they are a predetermined longitudinal distance remote from the lip 218. This longitudinal distance is established so the resilient member portions 222 extending into the interior passage 216 and so they contact a shoulder 5 or end face of the object 4 that is remote from the internal lip 218 when the object is fully inserted and abutting the lip.

Such a configuration yields an object mounting device 200 that is resistive to sharp forces or impacts along the long axis of the housing that would tend to pull the housing off of the object 4 such as, for example, the recoil force of a rifle being fired. When a rifle is fired, the rifles recoil motion pulls the scope mounted thereto rearwards. The recoil motion of the rifle and the inertia of the housing tends to pull the housing, that is mounted to an end of the scope, off the scope. The object mounting device 200 of the present invention, however, is resistive to such a recoil motion and thus keeps the housing mounted to the rifle scope.

In all other respects, reference should be made to the foregoing discussion for the respective and corresponding parts of the first embodiment for further details and construction regarding the housing 210 and resilient member 220 of the second embodiment.

Figure 10A:
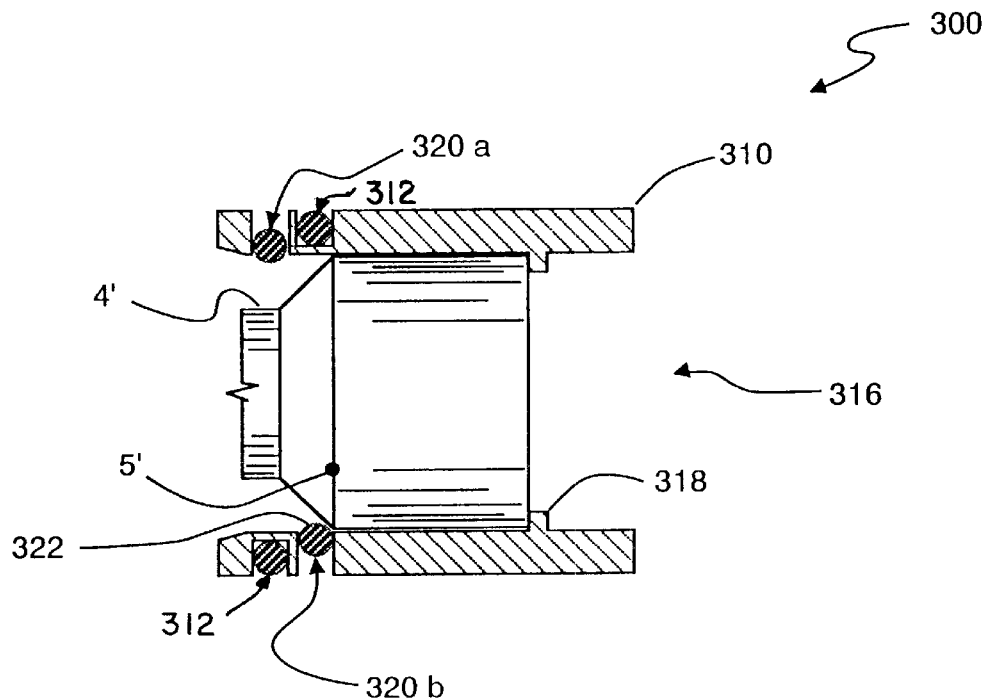
FIGS. 10A, B are partial cross-section views of an object mounting device according to a third embodiment taken along the long axis of a housing.

There is shown in FIGS. 10A, B an object mounting device 300 according to a third embodiment of the present invention that is configured to accommodate objects having varying lengths or objects to which another structure is attached and thus varying the distance from the front surface of the object and its back surface or a shoulder therefore. Such a mounting device 300 also is configurable so, as with the second embodiment, the mounting device can resist sharp forces and impacts along the long axis. An object mounting device 300 of the third embodiment includes a housing 310 and a plurality of resilient members 320a,b.

The housing 310 is configured with a plurality of grooves 312, one groove for each of the plurality of resilient members 320a,b that are disposed in side by side relation. Each groove 312 includes a plurality of slots 314 and lands 315, which slots communicate with the interior passage 316 of the housing. Additionally, the housing 310 includes an internal lip 318 or internal stop.

The grooves 312 are positioned and spaced from each other so the resilient member portions 322 of at least one of the resilient members 312a,b frictionally grasps or engages an outer surface of the object 4 when the object is fully disposed within the housing 310. The grooves also are positioned or formed so they are either proximate the internal lip 318 as illustrated in FIG. 7 or remote from the internal lip as shown in FIG. 9.

There is illustrated in FIGS. 10A,B an object mounting device 300 that is mounted on an cylindrical optical device 4' having a shoulder 5' at an end thereof. In one case, the cylindrical optical device 4', as illustrated in FIG. 10A is disposed within the housing 310 such that the front surface thereof abuts the internal lip 318. In this case, the portions 322 of the resilient member 320b that is closest to the internal lip 318 are in contact with and frictionally grasping the optical device's shoulder 5'.

Figure 10B:
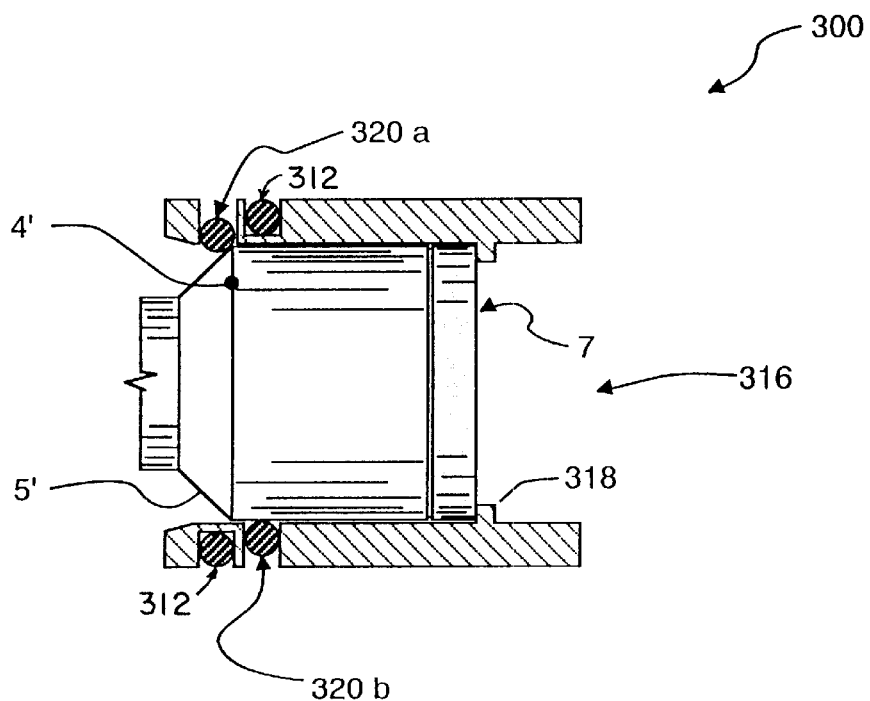

In a second case, as illustrated in FIG. 10B, a structure such as an optical filter 7 is attached to or located so as to abut the front surface of the cylindrical optical device 4'. Thus, when the cylindrical optical device 4' with the attached filter 7 is disposed within the housing 310 so the filter abuts the internal lip 318, the shoulder 5' of the cylindrical optical device 4' is at least grasped by the portions 322 of the resilient member 320a furthest from the internal lip. In this case, the corresponding portions 322 of the other resilient member 320b also can grasp the outside surface of the cylindrical body of the cylindrical optical device 4' as further means for securing the housing to the optical device 4'.

Although two grooves 312 and resilient members are illustrated, this is not a limitation as the housing can be configured with a multiplicity of grooves and a plurality or more of resilient members 320 that can be disposed in all or some of the multiplicity of grooves. Additionally, although the grooves are illustrated as being disposed abutted next to each other, the grooves can be spaced from each other so as to accommodate a wide variety of changing lengths. Thus, and in contrast with prior art devices, the object mounting device 300 according to the third embodiment and the housing 318 therefore are adaptable for use with objects having varying lengths. Such a device 300 also is capable of withstanding sharp impact loads imposed along the long axis of the housing 300.

In all other respects reference should be made to the foregoing discussion for the respective and corresponding parts of the first embodiment for further details and construction regarding the housing 310 and each of the plurality of resilient members 320a,b of the second embodiment. It is, however, within the scope of the third embodiment, for each of the plurality of resilient members 320a,b to be configured so they have similar or different construction and properties.

Additionally, although an object having a shoulder is illustrated it is within the scope of the third embodiment for the housing to be mounted to objects having a constant diameter or cross section (i.e., without a shoulder) as well as having a non-circular cross section.

In a fourth embodiment of the present invention, the resilient member extends only part way about the housing. Such an object mounting device is particularly advantageous in close quarter situations or arrangements where another structure is so close to the housing that this other structure could come into contact with the part of the resilient member that extends outwardly from the housing. This other structure also could prevent the housing from being easily mounted onto or dismounted from the object because of this obstruction and/or lead to the structural failure of the resilient member.

Figure 11A:
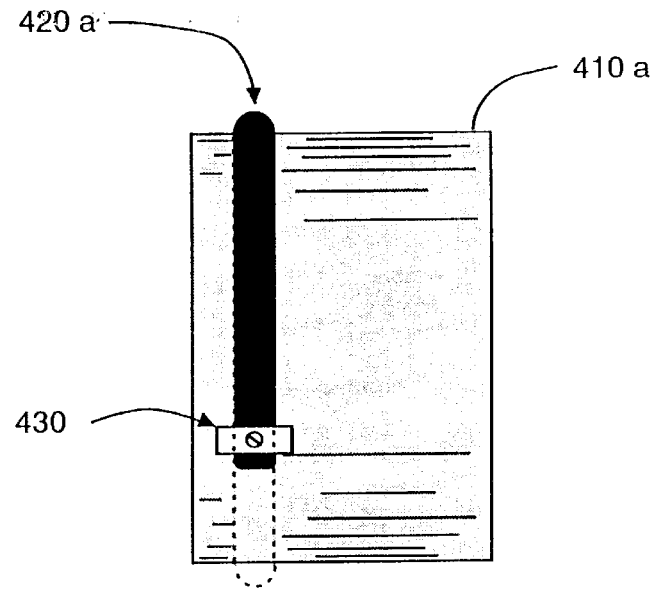
FIG. 11A is a side view of an object mounting device arranged with a resilient member extending partially about the housing.

In one specific illustrative example of an object mounting device 400a according to the fourth embodiment, as shown in FIG. 11A, the device includes a housing 410a, a resilient member 420a that extends part way around the housing and a screw or clamp 430 to secure each end of the resilient member. The housing 410a includes a plurality of lands and slots, which slots communicate with the interior passage of the housing as shown for example in FIGS. 3 and 7.

The resilient member 420a is disposed about the housing so, as with the other above-described object mounting devices, portions thereof extend within the housing interior passage. The screws or clamps 430 in addition to securing the ends of the resilient member 420a also maintain the tension in the resilient members such that the portions thereof that extend through the slots into the interior passage of the housing frictional grasp or engage the outer surface of the object when the object is inserted within the housing as with any of the above-described object mounting devices.

The resilient member 420a is an elastomeric strip of material or a section of an elastomeric O-ring. In all other respects reference should be made to the foregoing discussion for the respective and corresponding parts of the first embodiment for further details and construction regarding the housing 410a and the resilient member 420a.

Figure 11B:
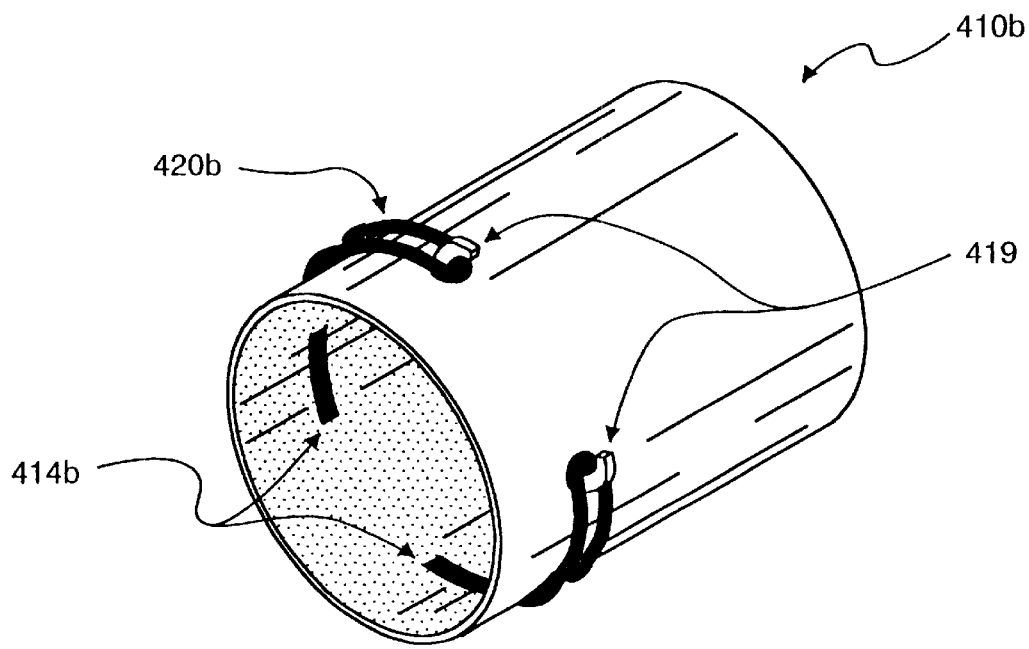
FIG. 11B is an axonometric view of another object mounting device arranged with a resilient member extending partially about the housing.

In another illustrative example, as shown in FIG. 11B, an object mounting device 400b according to the fourth embodiment includes a housing 410b and a resilient member 420b that extends part way around the housing. The housing 410b includes a plurality of lands and slots 414b and two hook-like structures 419 about which is secured the resilient member 420b. In a more specific embodiment, the resilient member 420b is an elastomer O-ring that is looped around the hook-like structures 419. Alternatively, the housing includes two or more pins extending outwardly from the outer surface of the housing to which are secured the resilient member 420b.

The slots 414b are configured or arranged as with the other described object mounting devices so portions of the resilient member 420b extend into the housing interior passage. In a more specific embodiment the slots are provided in the housing 410b so they lie under one or both adjacent paths or runs of the O-ring or resilient member 420b. In all other pertinent respects, reference should be made to the foregoing discussion for the respective and corresponding parts of the first embodiment for further details and construction regarding the housing 410b and the resilient member 420b.

In a number of the above-described object mounting devices of the present invention, the resilient member of a given embodiment is disposed within a groove formed or machined in the exterior surface of the housing. This, however, is not a limitation as the resilient member can be positioned and aligned on the housing using any of a number of techniques available to those skilled in the art. In one specific embodiment, and with reference to FIG. 12A the resilient member 520 is positioned and aligned on the housing 510a by means of the slots 514 that communicate with the interior passage of the housing. In another specific embodiment, and with reference to FIG. 12B, the resilient member 520 is positioned and aligned on the housing 510b by means of ridges 540 extending outwardly from the housing and on either side of the path of the resilient member 520. The ridges 540 can be formed, for example, by a U-shaped arcuate member that is secured to the outside surface of the housing 510.

Figure 12D:
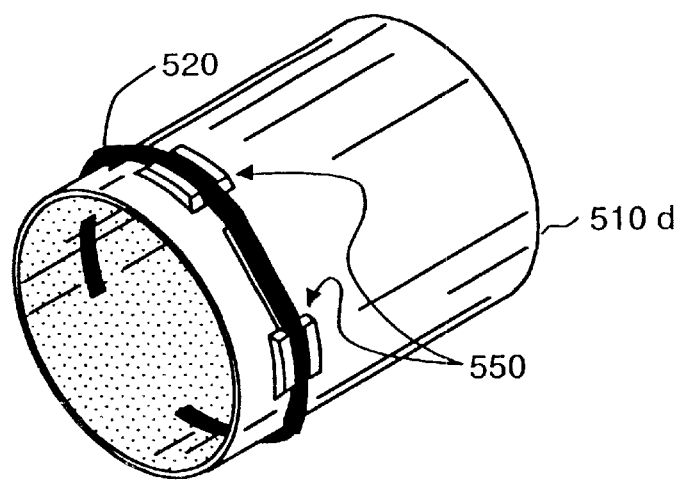

In a further specific embodiment, and with reference to FIG. 12C, the resilient member 520 is positioned and aligned on the housing 510c by means of a plurality of pins 530 extending outwardly from the housing. In yet another specific embodiment, and with reference to FIG. 12D, the resilient member 520 is positioned and aligned on the housing 510d by means of a plurality of blocks 550 spaced about the housing. and positioned on either side of the flexible resilient member. More particularly, the pins 530 or the blocks 550 are disposed on either side of the path of the resilient member so as to restrain any longitudinal motion.

Figure 13:
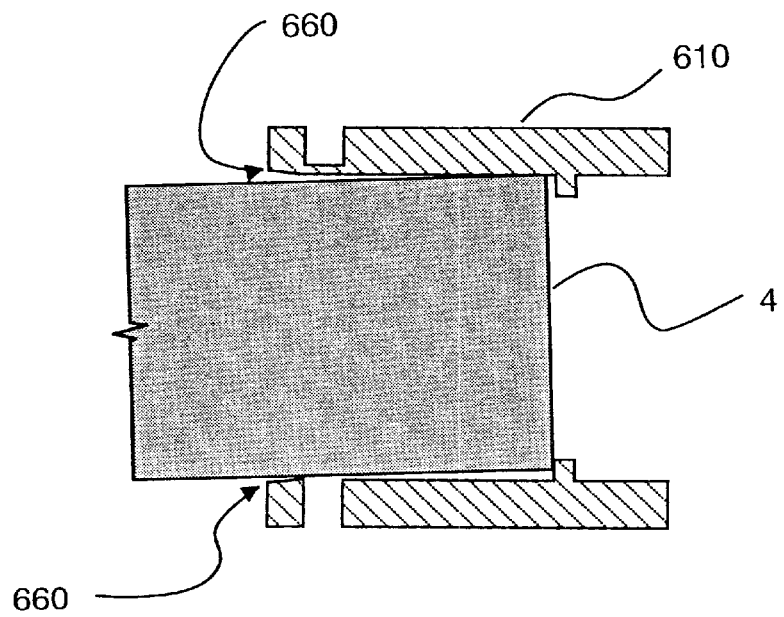
FIG. 13 is a partial cross-section view along the long axis of a housing having a chamfered corner.

In the above described object mounting devices, the diameter or cross-section of the housing interior passage is larger than the external diameter or cross-section of the object 4 to which the housing is to be mounted upon. To minimize the potential of the object becoming stuck or jammed in the passage and thus preventing the object 4 from being easily removed, and with reference to FIG. 13, the rear edge 660 of a housing 610 is chamfered. In this way, a sharp edge of the housing 610 will not press into a side of the object 4 if the long axes of the object and housing are at an angle with respect to each other. For example, the rear edge 660 can be chamfered at an angle in the range of from about 10° to about 30° and more particularly chamfered at an angle of about 15°.

Although a preferred embodiment of the invention has been described using specific terms, such description is for illustrative purposes only, and it is to be understood that changes and variations may be made without departing from the spirit or scope of the following claims.

What is claimed is:

1. A mounting device comprising:
    a housing, having all exterior surface, that is to be mounted to an optical device;
    a resilient member;
    an optical element disposed within the housing;
    wherein the housing is configured so as to include:
        an interior passage having an inner cross section larger than that of the optical device to which the housing is to be mounted onto, and
        at least one slot extending from the housing exterior surface and into the housing interior passage; and
    wherein the resilient member is disposed about at least a portion of the housing exterior surface so a portion of the resilient member is positioned within each of the at least one slot in the housing and so this portion of the resilient member protrudes into the interior passage, wherein the protruding portion contacts and frictionally grabs the optical device when the optical device is inserted into the housing interior passage thereby securing the housing to the optical device.

2. The mounting device of claim 1, wherein;
    the housing is configured with a plurality of slots being arranged concentrically about the housing; and
    portions of the resilient member are positioned within each of the plurality of slots so these resilient member portions protrude into the interior passage, wherein the protruding portions contact and frictionally grab the inserted optical device.

3. The mounting device of claim 2, wherein the plurality of slots are equi-angularly spaced about a long axis and the exterior surface of the housing.

4. The mounting device of claim 1, wherein the portion of the resilient member protrudes into the interior passage a predetermined distance beyond an inner surface of the interior passage.

5. The mounting device of claim 2, wherein the resilient member portions protrude into the interior passage a predetermined distance beyond an inner surface of the interior passage.

6. The mounting device of claim 5, wherein the predetermined distance is not more than about one-half the thickness or cross-sectional thickness of the resilient member.

7. The mounting device of claim 6, wherein the predetermined distance is about one-third the thickness or cross-sectional thickness of the resilient member.

8. The mounting device of claim 2, wherein the plurality of slots are located in the housing so the protruding portions of the resilient member contact and frictionally grab an end face of the inserted optical device.

9. The mounting device of claim 1, wherein:
    the housing is configured with a plurality of slots, the plurality of slots being arranged so as to form a plurality of sets of slots that are spaced from each other along a long axis of the housing, each set including at least one slot;
    the mounting device further comprises a plurality of resilient members, one resilient member for each set of at least one slot;
    wherein each of the plurality of resilient members is disposed about at least a portion of the housing exterior surface so a portion of each resilient member is positioned within the at least one slot of each set and so this portion of each resilient member protrudes into the interior passage; and
    wherein the protruding portion of at least one of the plurality of resilient members contacts and frictionally grabs the inserted optical device.

10. The mounting device of claim 9, wherein:
    the housing is configured so that each set includes a plurality of slots being arranged concentrically about the housing;
    portions of each resilient member are positioned within each of the plurality of slots in each set so these portions of each resilient member protrude into the interior passage; and
    the protruding portions of at least one of the plurality of resilient members contact anti frictionally grab the inserted optical device.

11. The mounting device of claim 10, wherein the plurality of slots of each set are equi-angular spaced about a long axis and the exterior surface of the housing.

12. The mounting device of claim 10, wherein the portions of the resilient member protrude into the interior passage a predetermined distance beyond an inner surface of the interior passage.

13. The mounting device of claim 9, wherein the plurality of slots are arranged in the housing so the protruding portion of each of the plurality of resilient members contacts and frictionally grabs the inserted optical device.

14. The mounting device of claim 13, wherein the plurality of slots are arranged in the housing so the protruding portion of at least one of the plurality of resilient members contacts and frictionally grabs an end face of the inserted optical device.

15. The mounting device of claim 1, wherein the resilient member is disposed about a circumference of the housing exterior surface.

16. The mounting device of claim 1, wherein the housing further includes a mechanism that secures parts of the resilient member with respect to the housing exterior surface.

17. The mounting device of claim 1, wherein the housing further includes a mechanism that localizes the resilient member with respect to the housing exterior surface so that the resilient member is not displaced longitudinally.

18. The mounting device of claim 1, wherein the optical element is an optical filter for filtering light passing through the optical device.

19. A mounting method for mounting a device including a housing to object, comprising the steps of:
   configuring the device housing so as to include an interior passage having an inner cross section larger than that of the object and at least one slot extending from an exterior surface of the housing and into the housing interior passage;
   disposing a resilient member about at least a portion of an exterior surface of the housing so a portion of the resilient member is positioned within each of the at least one slot and so this portion of the resilient member protrudes into the interior passage;
   inserting the object into the housing interior passage; and
   contacting and frictionally grabbing a portion of an exterior surface of the object with the portion of the resilient member that protrudes into the interior passage; thereby securing the device housing to the inserted object.

20. The mounting method of claim 19, wherein:
   said step of configuring further includes configuring the device housing with a plurality of slots arranged concentrically about the device housing;
   said step of disposing further includes disposing the resilient member such that a portion of the resilient member is positioned within each of the plurality of slots so these resilient member portions protrude into the interior passage; and wherein
   said step of contacting and frictionally grabbing includes contacting and frictionally grabbing plural portions of the exterior surface of the housing with the plurality of portions of the resilient member that protrude into the interior passage, thereby securing the device housing to the inserted object.

21. A mounting device comprising:
   a housing, having exterior surface, that is to be mounted to an optical device;
   a resilient member;
   wherein the housing is configured so as to include:
      an interior passage having an inner cross section larger than that of the optical device to which the housing is to be mounted onto, and
      at least one slot extending from the housing exterior surface and into the housing interior passage;
   wherein the resilient member is disposed about at least a portion of the housing exterior surface so a portion of the resilient member is positioned within each of the at least one slot in the housing and so this portion of the resilient member protrudes into the interior passage such that the protruding portion of the resilient member contacts and frictionally grabs the optical device when the optical device is inserted into the interior passage.

22. A mounting device comprising:
   a housing, having an exterior surface, that is to be mounted to am object;
   a resilient member;
   wherein the housing is configured so as to include;
      an interior passage having an inner cross section larger than that of the object to which the housing is to be mounted onto, and
      a plurality of slots being arranged concentrically about the housing, each slot of the plurality of slots extending from the housing exterior surface and into the housing interior passage;
   wherein the resilient member is disposed about at least a portion of the housing exterior surface so a portion of the resilient member is positioned within each of the plurality of slots in the housing and so these portions of the resilient member protrude into the interior passage as predetermined distance beyond an inner surface of the interior passage, where the predetermined distance is not more than about one-half the thickness or cross-sectional thickness of the resilient member; and
   wherein the protruding portions of the resilient member contact and frictionally grab the object when it is inserted into the interior passage.

23. The mounting device of claim 22, wherein the predetermined distance is about one-third the thickness or cross-sectional thickness of the resilient member.

24. A mounting device comprising:
   a housing, having an exterior surface, that is to be mounted to an optical device;
   a resilient member;
   wherein the housing is configured so as to include:
      an interior passage having an inner cross section larger than that of the optical device to which the housing is to be mounted onto,
      at least one slot extending from the housing exterior surface and into the housing interior passage, and
      an optical filter for filtering light passing through the optical device; and
   wherein the resilient member is disposed about at least a portion of the housing exterior surface so a portion of the resilient member is positioned within each of the at least one slot in the housing and so this portion of the resilient member protrudes into the interior passage, wherein the protruding portion contacts and frictionally grabs the optical device when it is inserted into the housing interior passage.

* * * * *